(12) United States Patent
Kim et al.

(10) Patent No.: US 9,898,247 B2
(45) Date of Patent: Feb. 20, 2018

(54) METHOD FOR CONTROLLING ELECTRONIC DEVICE USING EARPHONE AND ELECTRONIC DEVICE FOR THE SAME

(71) Applicant: Samsung Electronics Co., Ltd., Gyeonggi-do (KR)

(72) Inventors: Shin-Ho Kim, Gyeonggi-do (KR); Hwan-Woo Shim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/419,119

(22) Filed: Jan. 30, 2017

(65) Prior Publication Data
US 2018/0018142 A1  Jan. 18, 2018

(30) Foreign Application Priority Data
Jul. 14, 2016  (KR) .......................... 10-2016-008947

(51) Int. Cl.
| | |
|---|---|
| *G06F 3/16* | (2006.01) |
| *H01R 35/04* | (2006.01) |
| *H01R 24/58* | (2011.01) |
| *H04R 3/00* | (2006.01) |
| *H01R 107/00* | (2006.01) |

(52) U.S. Cl.
CPC ............ *G06F 3/165* (2013.01); *H01R 24/58* (2013.01); *H01R 35/04* (2013.01); *H04R 3/00* (2013.01); *H01R 2107/00* (2013.01); *H04R 2420/05* (2013.01)

(58) Field of Classification Search
None
See application file for complete search history.

(56) References Cited

U.S. PATENT DOCUMENTS

| | | | |
|---|---|---|---|
| 7,800,360 B2 * | 9/2010 | Johansson | G01D 5/145 200/51.09 |
| 9,513,616 B2 * | 12/2016 | Deluca | G05B 19/0426 |
| 2008/0247592 A1 * | 10/2008 | Kourzanov | G05G 1/08 381/384 |
| 2009/0107827 A1 * | 4/2009 | Hansson | G05G 1/10 200/571 |
| 2011/0135109 A1 | 6/2011 | Park et al. | |
| 2011/0216912 A1 | 9/2011 | Seo | |
| 2011/0300751 A1 * | 12/2011 | Wittenberg | G01D 21/02 439/620.21 |
| 2011/0317855 A1 * | 12/2011 | Andersson | G05G 9/047 381/109 |
| 2013/0108064 A1 * | 5/2013 | Kocalar | G01B 31/31857 381/58 |

(Continued)

FOREIGN PATENT DOCUMENTS

| | | |
|---|---|---|
| KR | 1020110064339 | 6/2011 |
| KR | 1020110100728 | 9/2011 |

*Primary Examiner* — Paul Huber
(74) *Attorney, Agent, or Firm* — The Farrell Law Firm, P.C.

(57) ABSTRACT

An electronic device is provided which includes a housing, a connecting member having a first conductive pattern formed on an inner surface thereof, and a processor configured to control a function of the electronic device according to a rotation of a plug corresponding to an alignment between the first conductive pattern and a second conductive pattern formed on the plug when the plug is inserted into a hole of the connecting member.

15 Claims, 13 Drawing Sheets

(56) References Cited

U.S. PATENT DOCUMENTS

2013/0148819 A1* 6/2013 You .................. H04R 3/00
                                            381/74
2015/0201263 A1* 7/2015 Choi .................. G06F 3/0487
                                            381/74

* cited by examiner

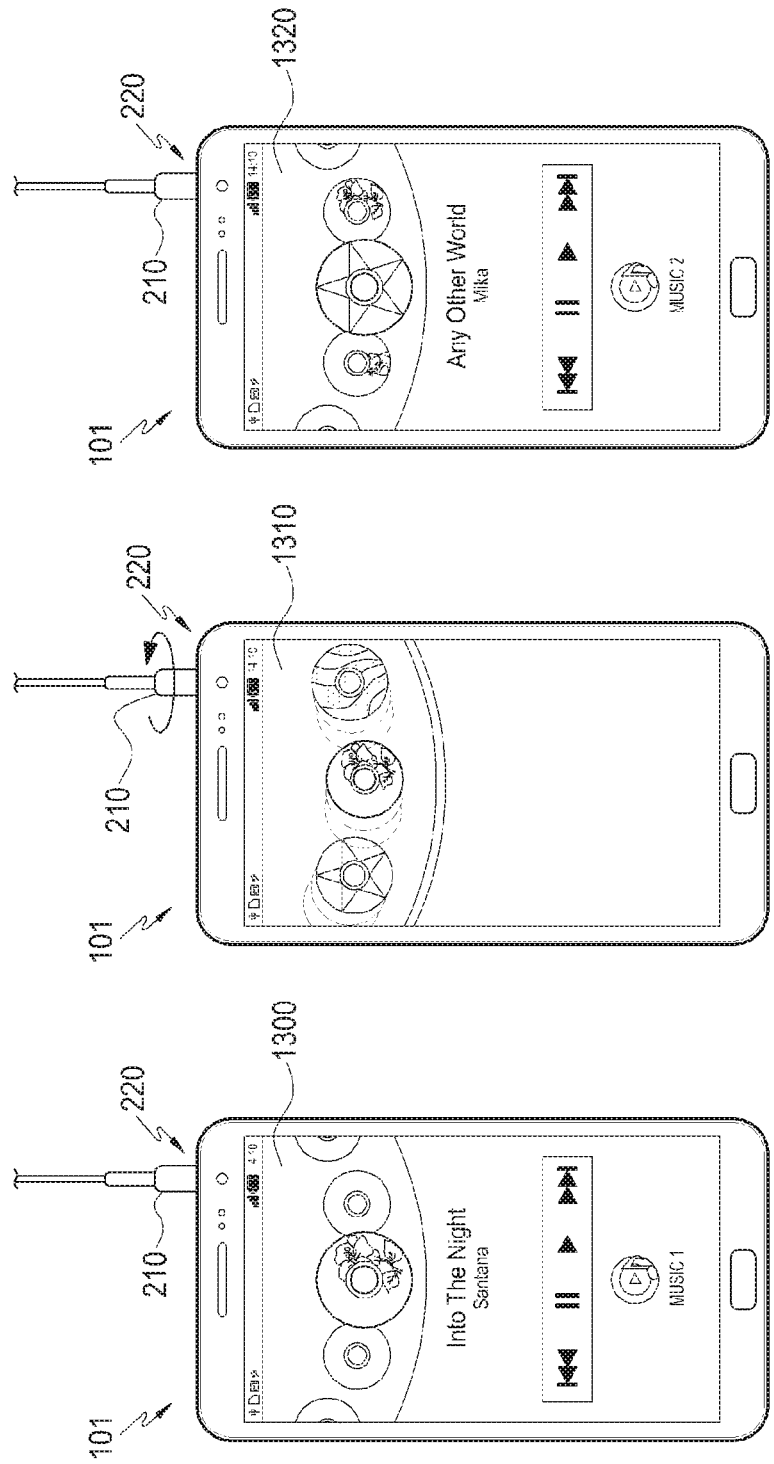

METHOD FOR CONTROLLING ELECTRONIC DEVICE USING EARPHONE AND ELECTRONIC DEVICE FOR THE SAME

PRIORITY

This application claims priority under 35 U.S.C. § 119(a) to Korean Patent Application Serial No. 10-2016-0089474, which was filed in the Korean Intellectual Property Office on Jul. 14, 2016, the entire disclosure of which is incorporated herein by reference.

BACKGROUND

1. Field of the Disclosure

The present disclosure generally relates to an electronic device, and more particularly, to methods for controlling electronic devices using earphones plugged into the electronic device.

2. Description of the Related Art

The advanced performance of electronic devices (e.g., smartphones) enables users to receive video, music, or other multimedia services anytime, anywhere. Multimedia service users may use earphones to prevent sound transmission or more clearly listen to audio signals from the electronic devices. To this end, the electronic devices support earphone interfaces for connection with earphones, e.g., four-pole interfaces supporting mobile communication voice call functionality.

To make use of various multimedia functions including playing music or movie files on an electronic device, the user may use the screen or control keys on the electronic device to control the electronic device. While an earphone is in connection with the electronic device, the user may simply connect or terminate a call by using control keys on the earphone interface. Many earphones do not provide volume keys or any other control keys. Thus, the control of such various functions requires changes in structure or software of the electronic device.

SUMMARY

According to an aspect of the present disclosure, a method is provided for controlling the functions of an electronic device by controlling the plug connected to an electronic device.

According to another aspect of the present disclosure, a method is provided for intuitive control of the functions of an electronic device using a structure in which the earphone plug connected to the electronic device is rotatable.

In accordance with an aspect of the present disclosure, an electronic device is provided, which includes a housing, a connecting member having a first conductive pattern formed on an inner surface thereof, and a processor controlling a function of the electronic device according to rotation of a plug corresponding to an alignment between the first conductive pattern and a second conductive pattern formed on the plug when the plug is inserted into a hole of the connecting member.

In accordance with another aspect of the present disclosure, a method is provided for controlling a function of an electronic device, which includes, when a plug is inserted into a hole of a connecting member, recognizing connection of the plug, the connecting member exposed through a surface of a housing of the electronic device and having a first conductive pattern formed on an inner surface, wherein a second conductive pattern is formed on the plug and controlling the function of the electronic device according to rotation of the plug corresponding to an alignment between the first conductive pattern and the second conductive pattern.

BRIEF DESCRIPTION OF THE DRAWINGS

These and other aspects, advantages, and features of the present disclosure will become apparent to those skilled in the art from the following detailed description, when taken in conjunction with the accompanying drawings, in which:

FIG. 13A illustrates an example navigation screen of a play-related object of an electronic device as an earphone plug rotates according to an embodiment of the present disclosure;

FIG. 13B illustrates an example navigation screen of a play-related object of an electronic device as an earphone plug rotates according to an embodiment of the present disclosure; and FIG. 13C illustrates an example navigation screen of a play-related object of an electronic device as an earphone plug rotates according to an embodiment of the present disclosure.

Throughout the drawings, like reference numerals will be understood to refer to like parts, components, and structures.

DETAILED DESCRIPTION

Figure 1:
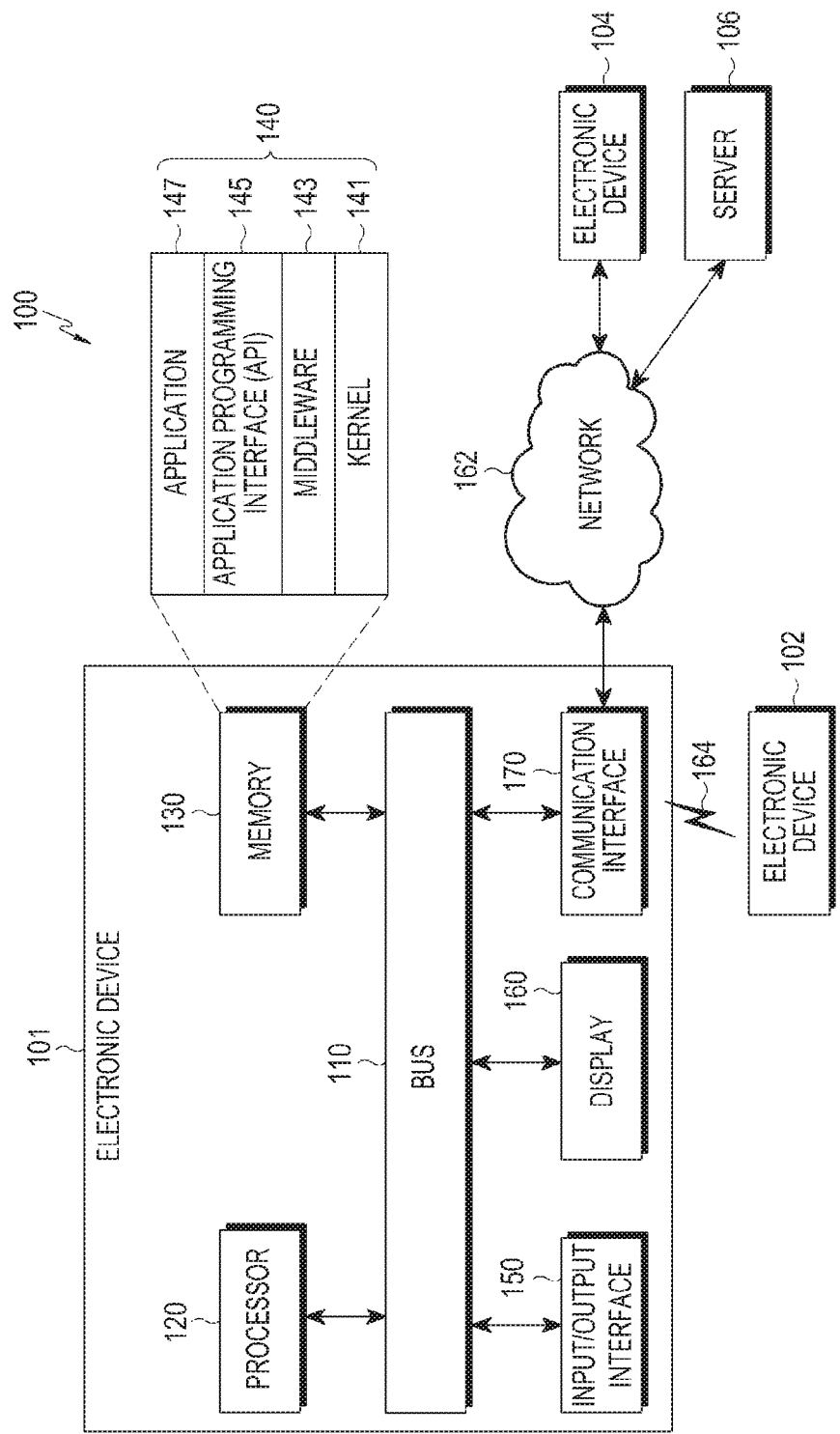
FIG. 1 illustrates a network environment including an electronic device according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto are within the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B," "at least one of A and/or B," or "A/B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it may be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device may perform an operation together with another device or parts. For example, the term "processor configured (or set) to perform A, B, and C" may mean a general-purpose processor (e.g., a CPU or application processor) that may perform the operations by executing one or more software programs stored in a memory device or a dedicated processor (e.g., an embedded processor) for performing the operations.

Examples of an electronic device according to an embodiment of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric or clothes-integrated device (e.g., electronic clothes), a body attaching-type device (e.g., a skin pad or tattoo), or a body implantable device. Examples of a smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar level measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller machines (ATMs), point of sales (POS) terminals, or Internet of Things (IoT) devices (e.g., a light bulb, various sensors, a sprinkler, a fire alarm, a thermostat, a street light, a toaster, fitness equipment, a hot water tank, a heater, or a boiler).

Examples of the electronic device may also include at least one of part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of the above-enumerated electronic devices. The electronic device is not limited to the above-listed embodiments. As used herein, the term "user" may denote a human or another device (e.g., an artificial intelligence electronic device) using the electronic device.

Referring to FIG. 1, according to an embodiment of the present disclosure, an electronic device 101 is included in a network environment 100. The electronic device 101 includes a bus 110, a processor 120, a memory 130, an input/output interface 150, a display 160, and a communication interface 170. The electronic device 101 may exclude at least one of the components or may add another component.

The bus 110 may include a circuit for connecting the components 110 to 170 with one another and transferring communications (e.g., control messages or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101.

According to an embodiment of the present disclosure, the memory 130 may store software and/or a program 140. The program 140 includes a kernel 141, middleware 143, an application programming interface (API) 145, and/or an application program (or "application") 147. At least a portion of the kernel 141, middleware 143, or API 145 may be referred to as an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various content (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and a first electronic device 102, a second electronic device 104, or a server 106. For example, the communication interface 170 may be connected with a network 162 through wireless communication or wired communication and may communicate with the second external electronic device 104 or server 106.

The wireless communication may include cellular communication using at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). According to an embodiment of the present disclosure, the wireless communication may include at least one of wireless fidelity (Wi-Fi), Bluetooth, Bluetooth low power (BLE), Zigbee, near field communication (NFC), magnetic secure transmission (MST), radio frequency, or body area network (BAN). The wireless communication may include global navigation satellite system (GNSS). The GNSS may be, e.g., global positioning system (GPS), global navigation satellite system (Glonass), Beidou navigation satellite system (Beidou) or Galileo, or the European global satellite-based navigation system. Hereinafter, the terms "GPS" and the "GNSS" may be used interchangeably. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101.

All or some of operations executed on the electronic device 101 may be executed on another or multiple other electronic devices 102 and 104 or server 106.

According to an embodiment of the present disclosure, when the electronic device 101 performs some function or service automatically or upon request, the electronic device 101, instead of executing the function or service on its own or additionally, may request electronic devices 102 and 104 or server 106 to perform at least some functions associated therewith. The electronic devices 102 and 104 or server 106 may execute the requested functions or additional functions and transfer a result of the execution to the electronic device 101. The electronic device 101 may provide a requested function or service by processing the received result as it is or additionally. To this end, a cloud computing, distributed computing, or client-server computing technique may be used, for example.

In accordance with another aspect of the present disclosure, a method is provided for using the structure of an earphone plug that is connected to an electronic device which is rotatable and allows for intuitive control of various functions of the electronic device, such as channel search, screen brightness adjustment, screen size adjustment, as well as volume adjustment.

The body of the electronic device 101 includes a housing forming its outer appearance. A hole (e.g., a connecting member) may be formed in the housing for having a plug inserted therethrough. The hole may be formed to be exposed through a surface of the housing of the electronic device 101, and the plug may be inserted through the hole for electrical connection.

The processor 120 may detect the insertion and connection of the plug into the hole. As the plug is inserted and electrically connected into the hole of the connecting member of the electronic device 101, a jack interrupt signal may occur. The processor 120 may recognize the insertion and connection of the plug based on the generated jack interrupt signal.

The plug may be formed to rotate in two directions while remaining inserted and connected to the hole. For detecting the rotation of the plug, a first conductive pattern may be formed on an inner surface of the connecting member, and a second conductive pattern may be formed in at least a portion of the body of the plug.

When the plug with the second conductive pattern is inserted into the hole of the connecting member with the first conductive pattern as described above, the processor 120 may recognize the connection of the plug. As the plug rotates clockwise or counterclockwise while remaining inserted and connected to the hole, the processor 120 may control functions of the electronic device corresponding to the rotation of the plug.

As the plug rotates, a portion of the second conductive pattern formed in at least a portion of the body of the plug may face the first conductive pattern formed on the inner surface of the hole, and a signal corresponding to the facing state may be detected. In other words, whenever the first conductive pattern and the second conductive pattern are aligned with each other, a voltage is generated at a contact point, and the processor 120 may recognize which contact point the voltage occurs at, and may recognize in which direction the plug rotates.

Corresponding to the direction in which the user rotates the earphone plug, the processor 120 may control the function of the electronic device according to the rotation direction of the plug corresponding to the alignment between the first conductive pattern and the second conductive pattern.

According to an embodiment of the present disclosure, the processor 120 may adjust the volume of the electronic device 101 corresponding to the direction in which the plug rotates. For example, the processor 120 may perform control to turn the volume up as the plug rotates in one direction while turning the volume down in the opposite direction of rotation.

The processor 120 may also control the speed of volume adjustment of the electronic device 101 corresponding to the degree of rotation of the plug, e.g., the rotation speed or angle of the plug. Here, the volume is adjusted corresponding to the rotation of the plug and may be an audio volume or microphone volume.

Figure 2:
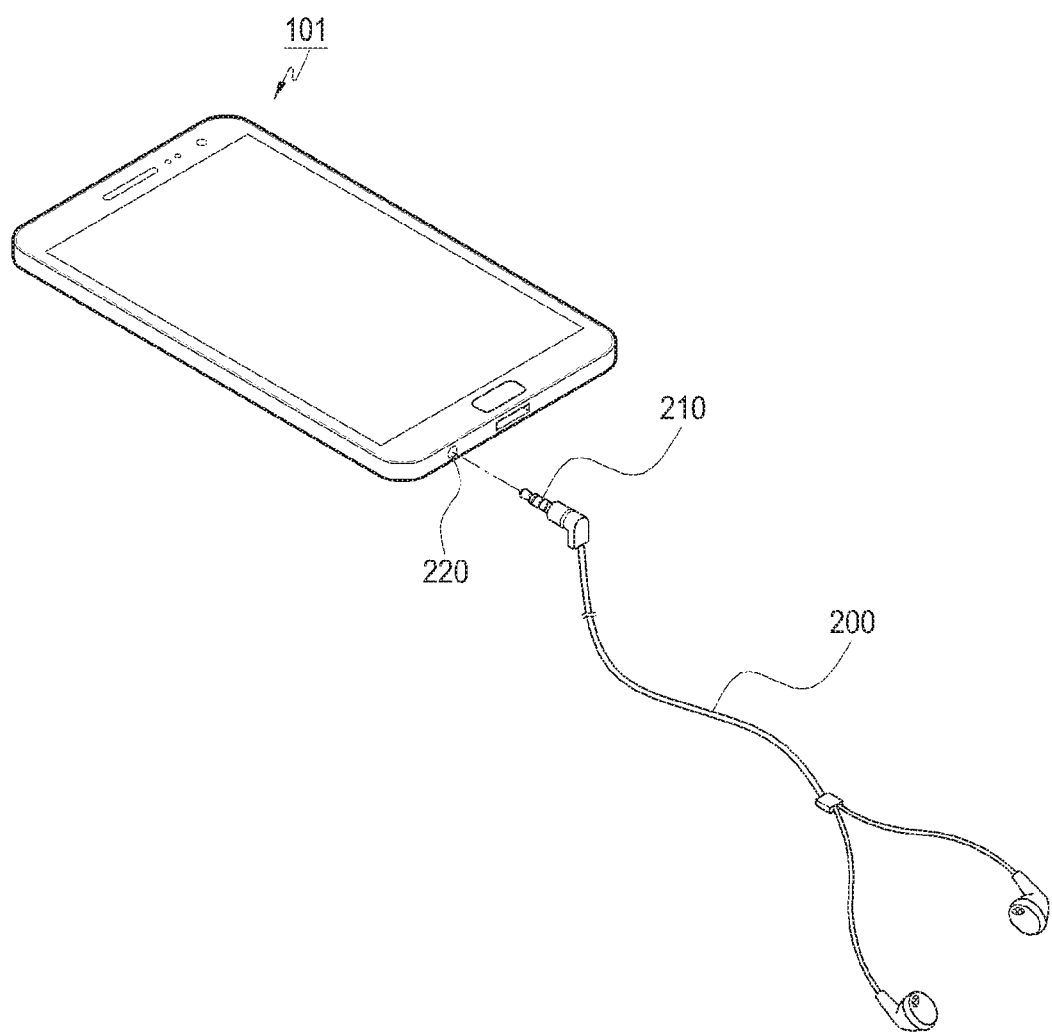
FIG. 2 illustrates the configuration of an electronic device and an earphone connected to the electronic device according to an embodiment of the present disclosure.

FIG. 2 schematically illustrates the configuration of an electronic device and an earphone connected to the electronic device according to an embodiment of the present disclosure.

Referring to FIG. 2, the electronic device 101 includes a connecting member 220 for connection of an earphone 200. The connecting member 220 may be denoted as an interface where the electronic device 101 and the earphone 200 may connect together, and the connecting member 220 may be implemented as an ear jack for connection of an earphone or headset.

Meanwhile, although the ear jack to which the earphone plug is connected is described as the connecting member in describing a specific embodiment of the present disclosure, the connecting member may include other types of connecting members such as, e.g., a plug for connecting a power source, an interface, such as a high-definition multimedia interface (HDMI) terminal or charging terminal, which is provided in an information communication device for connection with an external device, a socket for insertion of a storage medium, or an antenna socket for coupling with a detachable antenna.

Further, although a four-pole earphone plug is described as being inserted into the connecting member in describing a particular embodiment of the present disclosure, any type of plug may be used as long as it has a structure which permits it to be inserted into the connecting member and rotatable, such as a three-pole earphone plug, ear jack terminal cap, or a plug of an external device.

The connecting member 220 may be formed in a cylinder shape having one side opened, and its body has a hole through which, e.g., the earphone plug 210 is inserted and connected. The hole may extend in an elongated direction of the body. In particular, the first conductive pattern may be formed in an inner surface of the connecting member 220 to detect the rotation of the earphone plug 210.

Figure 3:
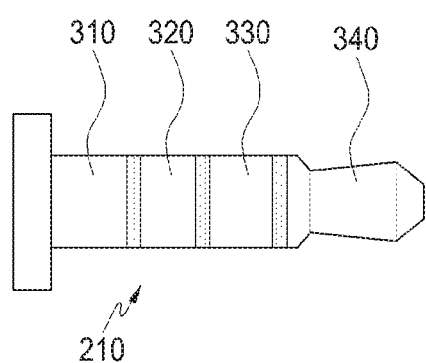
FIG. 3 illustrates an example of the structure of an earphone plug according to an embodiment of the present disclosure.

FIG. 3 illustrates an example of the structure of an earphone plug according to an embodiment of the present disclosure.

Referring to FIG. 3, the structure of the earphone plug 210, e.g., in the case of a four-pole earphone plug, includes a ground (GND) terminal 310, a microphone (MIC) terminal 320, and a first and second audio terminal 330 and 340. When the plug is a three-pole earphone plug, it may be designed to exclude the microphone terminal 320. Here, the first and second audio terminal 330 and 340, respectively, may be a right (R) audio terminal 330 and left (L) audio terminal 340. The ground terminal 310, the microphone (MIC) terminal 320, and the first and second audio terminal 330 and 340, each, may be formed of a conductive material, and they may sequentially be formed from a front side of the plug 210 to its rear side, with insulating lines formed therebetween to electrically isolate them.

The microphone terminal 320 functions to transfer voice input through the microphone of the earphone to the electronic device 101, and the right audio terminal 330 and the left audio terminal 340 may transfer sound to the earphone that may output the sound.

In order for the electronic device 101 to detect the rotation of the earphone plug 210 inserted into the connecting member 220, a signal detected by the rotation may be transferred to the processor 120. To this end, one of a plurality of connection terminals of the plug 210 may be used. Although an example in which the right (R) audio terminal 330 is used is now described, any one of the terminals other than the ground terminal 310 may also be used.

According to an embodiment of the present disclosure, any one of the connection terminals used to detect the rotation of the earphone plug 210 may have at least a portion of the outer surface of the body formed of a conductive material, with the rest of the outer surface formed of a non-conductive material, rather than the whole outer surface of the body being formed of such conductive material. The structure of any one terminal in such earphone plug 210 is now described in further detail.

Figure 4A:
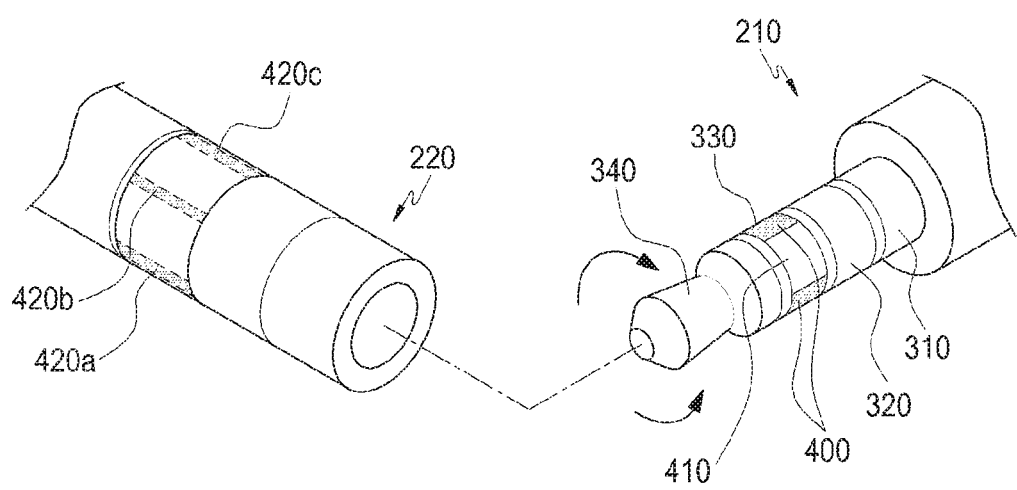
FIG. 4A illustrates a perspective view of a coupling between a connecting member of an electronic device and an earphone plug structure according to an embodiment of the present disclosure.

FIG. 4A illustrates a perspective view of a coupling between a connecting member of an electronic device and an earphone plug structure according to an embodiment of the present disclosure.

Figure 4B:
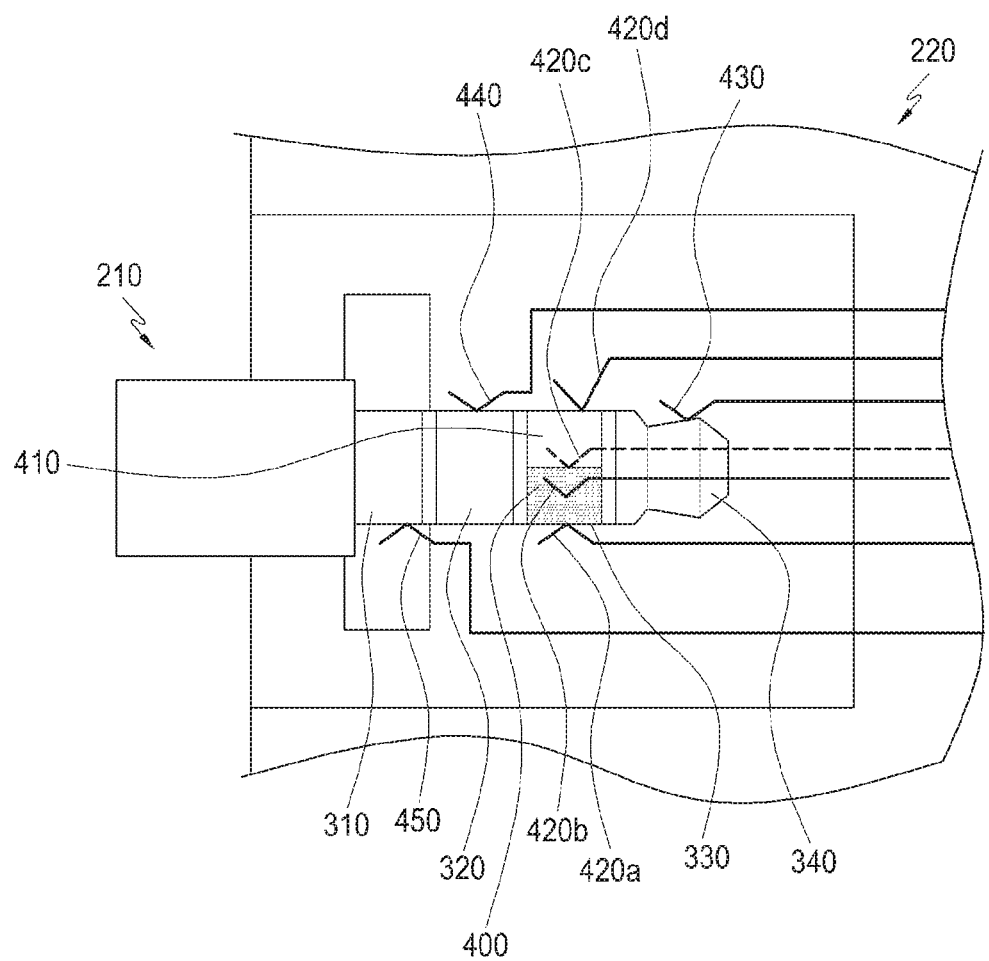
FIG. 4B illustrates contact points of an earphone plug structure when inserted into a connecting member of an electronic device according to an embodiment of the present disclosure.

FIG. 4B illustrates contact points of an earphone plug structure when inserted into a connecting member of an electronic device according to an embodiment of the present disclosure.

Referring to FIG. 4A, the earphone plug 210 may be inserted into the connecting member 220 formed in the electronic device 101 and may thereby be electrically connected.

The plug 210 includes a plurality of connection terminals 310, 320, 330, and 340, and in the case of a four-pole earphone, a ground terminal (GND) 310, microphone (MIC) terminal 320, right (R) audio terminal 330, and left (L) audio terminal 340 may be formed in this order from an end of the plug 210. The type or arrangement of the connection terminals shown in FIG. 4A is merely an example, and the present disclosure is not limited thereto.

According to an embodiment of the present disclosure, the right (R) audio terminal 330 of the plurality of connection terminals 310, 320, 330, and 340 is used as shown in FIG. 4A so that a signal detected as the plug 210 rotates may be delivered to the processor 120. As shown in FIG. 4A, a conductive pattern 410 may be formed on at least a portion of areas surrounding the outer surface of the body of the right audio terminal 330 of the plug 210, and the areas other than the portion may be formed of a non-conductive material 400.

When a four-pole earphone plug 210 is inserted and connected to the hole of the connecting member 220, the connection terminals formed in the plug 210 may be brought in contact with a plurality of contact points, respectively, formed on the inner surface of the hole of the connecting member 220. As such, the contact points formed in the inner space of the hole of the connecting member 220 are arranged and positioned to contact the connection terminals, respectively, of the plug 210 when the plug 210 is inserted. Accordingly, as the plug 210 is inserted, the connection terminals 310, 320, 330, and 340 of the plug 210 may come in contact with the respective signal lines in the connecting member 220 respectively corresponding to the connection terminals 310, 320, 330, and 340 of the plug 210.

Thus, when the four-pole earphone plug 210 is inserted and connected to the hole of the connecting member 220, the right audio terminal 330 and left audio terminal 340 may be connected with an audio processor through their respective corresponding signal lines. Therefore, the right audio terminal 330 and the left audio terminal 340 may function to deliver sound signals generated from the electronic device 101 to the right and left speaker of the earphone, respectively.

Further, the ground terminal 310 may receive ground signals and may be separated from the other connection terminals by insulators. Further, the microphone terminal 320 may be connected with the audio processor through a microphone signal line, and thus, the microphone terminal 320 may transfer the user's voice signals to the audio processor.

According to an embodiment of the present disclosure, a conductive pattern of which at least a portion is formed of a conductive material may be formed along the circumferential surface of the outer surface of the body of the right audio terminal 330 so that when the plug 210 is inserted into the connecting member 220 and rotates, a signal may be detected according to the rotation. For example, when the right audio terminal 330 of the plug 210 has a cylindrical shape, the length of the area where the conductive pattern is formed may correspond to the height of the cylindrical shape, and may be implemented to be the same height as the cylinder or correspond to a portion of the height. In other words, the length of the area having the conductive pattern may be formed in a lengthwise direction within the length of the right audio terminal 330. Further, the width of the conductive pattern 410 formed in the plug 210 may enable simultaneous contact to one or two contact points among the plurality of contact points 420a, 420b, and 420c.

The plurality of contact points 420a, 420b, and 420c may be arranged at the position contacting the conductive pattern formed in the right audio terminal 330 in the inner space of the connecting member 220 so that when the plug 210 is inserted, an electrical signal according to the rotation of the plug 210 may be output. Here, the plurality of contact points 420a, 420b, and 420c may be configured to output a different voltage than a voltage detected on the signal line in the connecting member 220 corresponding to each connection terminal 310, 320, 330, and 340 of the plug 210 as the plug 210 is inserted.

Further, the plurality of contact points 420a, 420b, and 420c may be configured to be spaced apart from each other at predetermined distances on the circumference of the inner surface of the connecting member 220. According to an embodiment of the present disclosure, in the case of a four-pole earphone, the plurality of contact points may be configured to have at least four contact points, and the plurality of contact points 420a, 420b, and 420c may have the same length as the size in the lengthwise direction of the conductive pattern formed in the right audio terminal 330. Accordingly, the lengthwise-direction size of the plurality of contact points 420a, 420b, and 420c may be the same as the lengthwise-direction size of the area where the conductive pattern of the plug 210 is formed.

FIG. 4B illustrates contact points of an earphone plug structure upon insertion into a connecting member of an electronic device according to an embodiment of the present disclosure.

Referring to FIG. 4B, as the plug 210 is inserted into the connecting member 220, the terminals 310, 320, 330, and 340 of the plug 210 may be brought in contact with the connecting member 220 while contacting the signal lines (or contact points) in the connecting member 220 which respectively correspond to the terminals. For example, the left audio terminal 340 of the plug 210 is connected with a signal line 430 connected to a 'L' port of the audio processor. Further, the microphone terminal 320 is connected with a signal line connected to a 'MIC' port of the audio processor. The ground terminal 310 is connected with a ground line 450.

The right audio terminal 330 of the plug 210 may have three more signal lines other than the signal line connected to a 'R' port of the audio processor. Accordingly, the right audio terminal 330 of the plug 210 may be connected with at least one signal line of the signal lines 420a, 420b, 420c, and 420d. The signal lines 420a, 420b, 420c, and 420d are formed in the inner space of the insertion hole, only two of the four signal lines 420a, 420b, 420c, and 420d contact the conductive area 410 of the right audio terminal 330 of the plug 210, and the other two signal lines contact the non-contact area 400 of the right audio terminal 330. Accordingly, although an electrical connection is made with the signal lines contacting the conductive area 410 of the right audio terminal 330 of the plug 210, no electrical connection is made with the signal lines contacting the non-conductive area 400.

Figure 5:
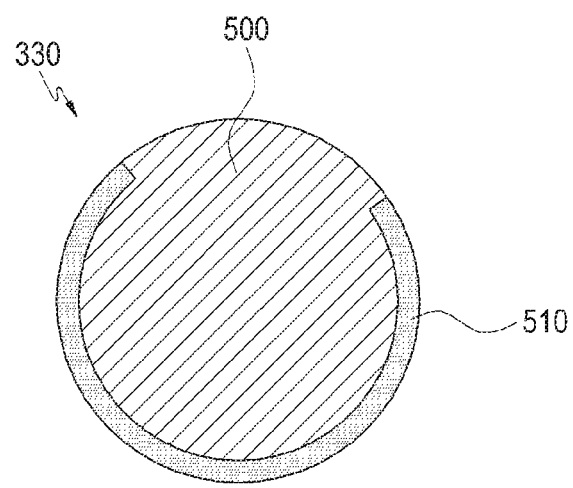
FIG. 5 illustrates a cross section of an earphone plug according to an embodiment of the present disclosure.

FIG. 5 illustrates a cross section of an earphone plug according to an embodiment of the present disclosure.

FIG. 5 shows an example of a cross section of the right audio terminal 330. A non-conductive material 510 is formed along the circumferential surface of the cylindrical shape of the right audio terminal 330, with the conductive material exposed in a portion thereof. The size of the portion corresponds to the width of the conductive pattern 410. The width of the conductive pattern 410 formed in the plug 210 may enable simultaneous contact to one or two contact points among the plurality of contact points 420a, 420b, and 420c.

Among the areas surrounding the cylindrical outer surface of the right audio terminal 330, the areas other than the portion 500 where the conductive pattern is formed, are formed of the non-conductive material 510. The conductive pattern 500 may be formed to be sized or dimensioned to connect with at least one of the plurality of contact points included in the conductive pattern of the connecting member 210.

Figure 6A:
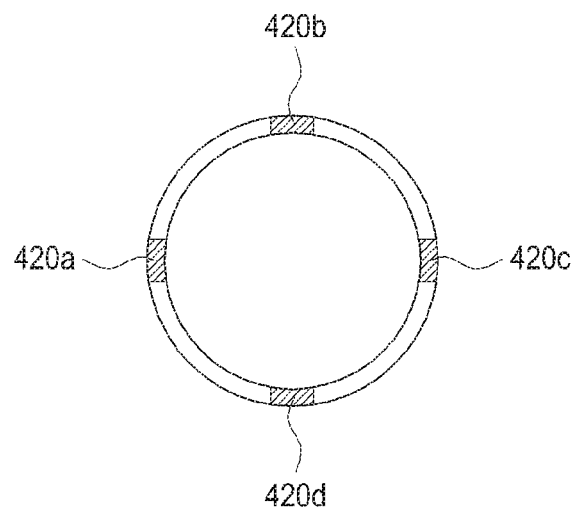
FIG. 6A illustrates a cross section of a connecting member where an earphone plug connects according to an embodiment of the present disclosure.

FIG. 6A illustrates a cross section of a connecting member where an earphone plug connects according to an embodiment of the present disclosure.

Figure 6B:
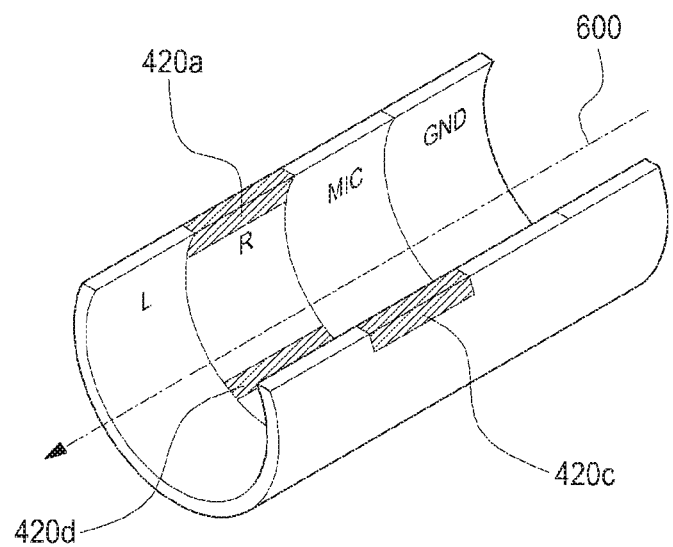
FIG. 6B illustrates a structure of a connecting member where an earphone plug connects according to an embodiment of the present disclosure.

FIG. 6B illustrates a structure of a connecting member where an earphone plug connects according to an embodiment of the present disclosure.

Referring to FIG. 6A, provided is an example in which a plurality of contact points 420a, 420b, 420c, and 420d are arranged to output electrical signals according to the rotation of the plug 210 when the plug 210 is inserted onto the inner surface of the connecting member 220 is shown. When there are at least three or more contact points, the rotation of the plug 210 may be detected. The plurality of contact points 420a, 420b, 420c and 420d may be arranged on the circumference of the inner surface of the connecting member 220 to be spaced apart from each other at predetermined intervals, they may be arranged at positions contacting the conductive pattern formed in the right audio terminal 330 as the plug 210 rotates.

Referring to FIG. 6B, the plurality of contact points 420a, 420b, 420c, and 420d may be arranged at particular positions inside the cylindrical shape along the lengthwise direction where the plug 210 is inserted. For example, when four contact points are implemented to detect the rotation of the plug 210 as shown in FIG. 6B, the plurality of contact points 420a, 420b, 420c, and 420d may be positioned at four separate angular positions of 0°, 90°, 180°, and 270°, respectively, and when three contact points are provided, they may be positioned at three separate angular positions of 360°, e.g., 0°, 120°, and 240°. As such, the number and arrangement of the contact points may be varied depending on the design or conductive pattern formed in the plug 210.

Figure 7:
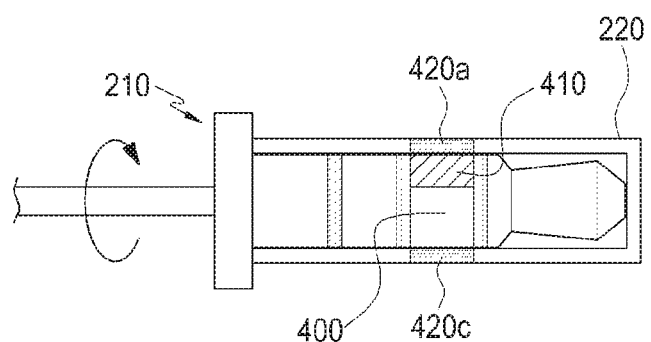
FIG. 7 illustrates insertion of an earphone plug into a connecting member of an electronic device according to an embodiment of the present disclosure.
Figure 8:
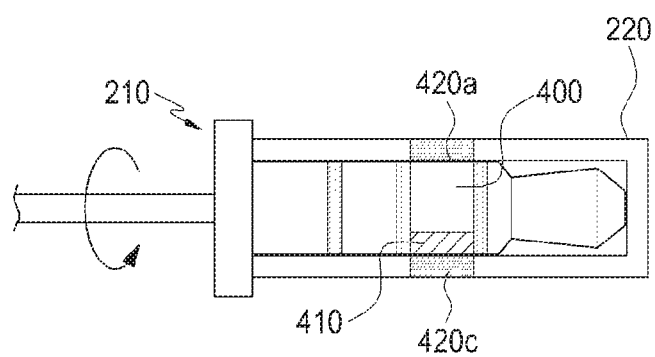
FIG. 8 illustrates insertion of an earphone plug into a connecting member of an electronic device according to an embodiment of the present disclosure.

FIGS. 7 and 8 illustrate insertion of an earphone plug into a connecting member of an electronic device according to an embodiment of the present disclosure.

FIG. 7 illustrates an example in which the conductive pattern 410 of the plug 210 contacts contact point 420a of a plurality of contact points 420a, 420b, 420c, and 420d formed to detect the rotation of the plug 210 as the plug 210 rotates while remaining inserted and connected to the connecting member 220.

FIG. 8 illustrates an example in which the conductive pattern 410 of the plug 210 contacts contact point 420c of the plurality of contact points 420a, 420b, 420c, and 420d as the plug 210 rotates. As shown in FIGS. 7 and 8, even when any one contact point comes in contact with the conductive pattern 410 of the plug 210, an electrical signal by the contact may be generated so that the rotation may be recognized. However, according to an embodiment of the present disclosure, an implementation in which two contact points contact the conductive pattern 410 of the plug 210 may afford more accurate recognition of the degree and direction of the rotation.

Figure 9:
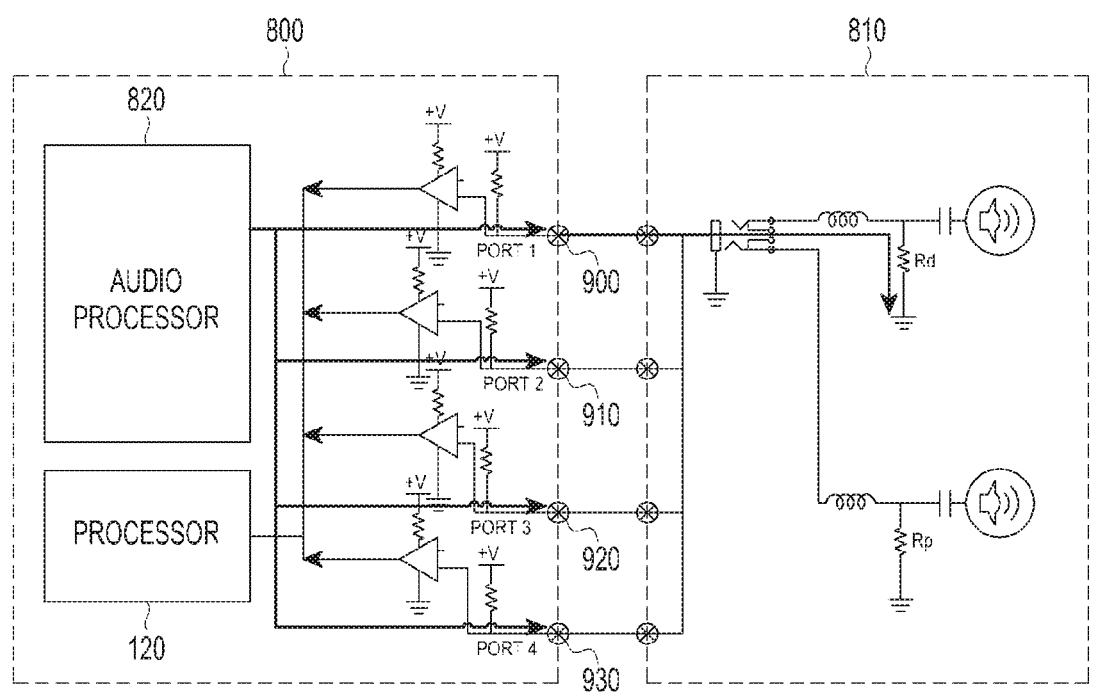
FIG. 9 is a circuit diagram illustrating an earphone plug and a connecting member of an electronic device according to an embodiment of the present disclosure.

FIG. 9 is a circuit diagram illustrating an earphone plug and a connecting member of an electronic device according to an embodiment of the present disclosure.

FIG. 9 illustrates a circuit configuration of an earphone 810 and jack interface 800 of an electronic device 101. In particular, a circuit configuration for a plurality of contact points 420a, 420b, 420c, and 420d for detecting the rotation of the plug.

Referring to FIG. 9, the audio processor 820 may periodically scan audio reference voltages through audio output ports. The signal lines connected to the audio processor 820 may correspond to the contact points 420a, 420b, 420c, and 420d, respectively. The processor 120 may be aware of a contacted port by monitoring voltage generated from each contact point 420a, 420b, 420c, and 420d.

When the voltage (or reference voltage) detected from the signal line in the connecting member 220 corresponding to the right audio terminal 330 of the plug 210 as the plug 210 is inserted is +V, the voltages outputted from the plurality of contact points 420a, 420b, 420c, and 420d may be different from the detected voltage. For example, when the detected voltage is +V, this may be a voltage by the connection of the plug 210, and a portion of the second conductive pattern formed in at least a portion of the plug body may contact any one or two of the contact points.

In such case, the magnitude of the voltage applied to the input terminal in an internal comparator may be varied, and an interrupt signal may be transferred to the processor 120. Such interrupt signal may be a signal indicating the port 900, 910, 920, and 930 are currently contacted. Accordingly, the processor 120 may detect variations in the ports by periodical monitoring the ports. The voltage output as the plug rotates may be $+V*(R_d/(R_p+R_d))$, and a voltage lower than the reference voltage +V may be output. For example, when the reference voltage +V is being output from port 1 900 and port 2 910, and $+V*(R_d/(R_p+R_d))$ is being output from port 3 920 and port 4 930, it may be seen that the contact points connected with port 3 920 and port 4 930 contact the conductive pattern 410 of the right audio terminal 330 of the plug 210. In other words, the reference voltage +V being outputted from port 1 900 and port 2 910 may mean that there is no contact, indicating that the contact points connected with port 1 900 and port 2 910 contact the non-conductive area 400 of the right audio terminal 330 of the plug 210 but there is no electrical connection.

When $+V*(R_d/(R_p+R_d))$ is detected from port 2 910 and port 3 920 as the plug 210 rotates, the processor 120 may be aware that it rotates in the direction corresponding to port 2 from port 3 based on the interrupt signal indicating the port contacted corresponding to the detected voltage, and may detect the direction of the rotation.

As such, a voltage is generated from a contact point contacted as the plug rotates, and the processor 120 may recognize which contact the voltage occurs at, and may recognize in which direction the plug rotates.

Figure 10:
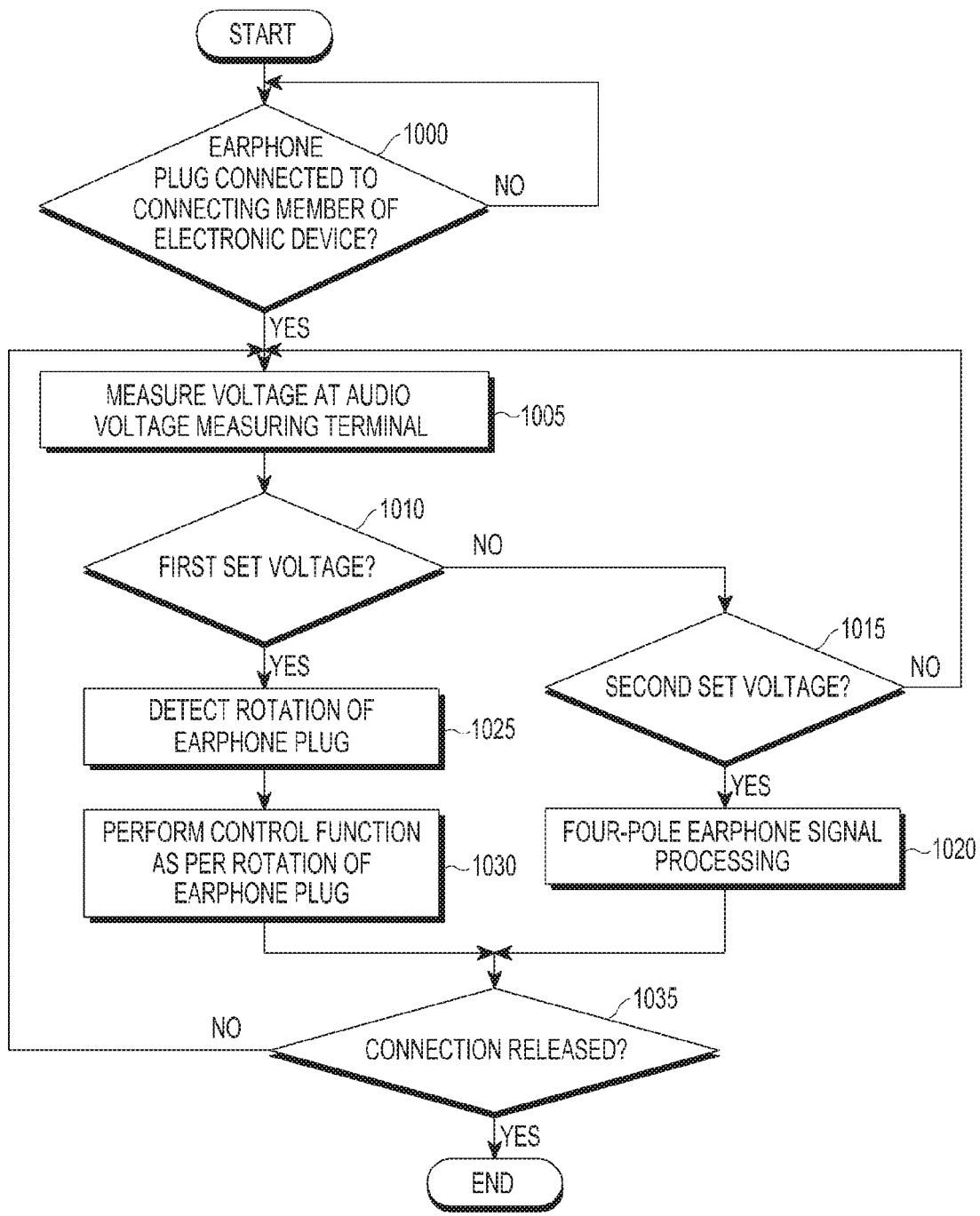
FIG. 10 is a flowchart illustrating operations of an electronic device for controlling the functions of the electronic device as an earphone plug rotates according to an embodiment of the present disclosure.

FIG. 10 is a flowchart illustrating operations of an electronic device for controlling the functions of the electronic device as an earphone plug rotates according to an embodiment of the present disclosure.

Referring to FIG. 10, the electronic device 101 detects whether the earphone plug 210 is connected to the connecting member 220 of the electronic device 101 in step 1000. Upon detecting the connection of the plug 210, the electronic device 101 periodically measures the voltage at the audio voltage measuring terminal in step 1005. The electronic device 101 determines whether the measured voltage is a first set voltage (e.g., $+V*(R_d/(R_p+R_d))$) in step 1010, and when the measured voltage is not the first set voltage, the electronic device 101 determines whether the measured voltage is a second set voltage (e.g., +V) in step 1015. Upon detecting the second set voltage in step 1015, the electronic device 101 performs a process as per a four-pole earphone signal in step 1020.

By contrast, when the first set voltage is detected in step 1010, the electronic device 101 detects the rotation of the earphone plug in step 1025 to perform a control function on the electronic device 101 as per the rotation of the earphone in step 1030. Subsequently, as long as the connection of the earphone is not released in step 1035, the electronic device 101 returns to step 1005 to repeat the above-described operations.

Figure 11:
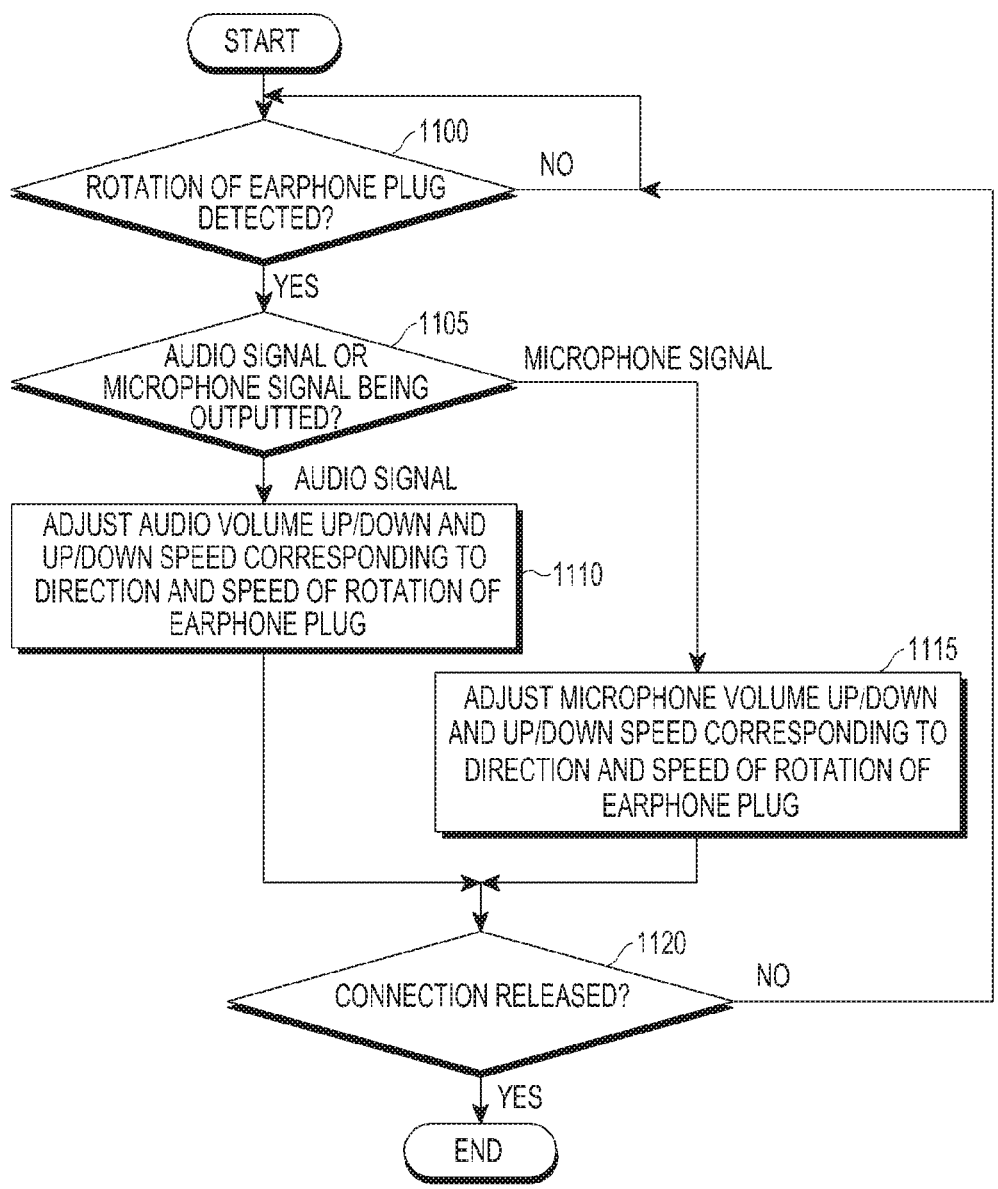
FIG. 11 is a flowchart illustrating operations of an electronic device for adjusting audio/microphone volume on the electronic device as an earphone plug rotates according to an embodiment of the present disclosure.

FIG. 11 is a flowchart illustrating operations of an electronic device for adjusting audio/microphone volume on the electronic device as an earphone plug rotates according to an embodiment of the present disclosure.

Referring to FIG. 11, while the plug remains inserted and connected to the connecting member, upon detecting the rotation of the earphone plug in step 1100, the electronic device 101 determines whether an audio signal or microphone signal is being output in step 1105. When the audio signal is being output, the electronic device 101, in step 1110, adjusts the audio volume up/down and the up/down speed corresponding to the direction and speed of the rotation of the earphone plug. Here, the degree of rotation of the earphone plug may correspond to the amount and angle of rotation of the plug. Such an implementation may adjust the volume as much as the rotation of the plug, or it may be implemented that the speed of volume adjustment increases or decreases according to the speed of rotation.

When the microphone signal is being outputted in step 1105, the electronic device 101, in step 1115, adjusts the microphone volume up/down and the up/down speed corresponding to the direction and speed of the rotation of the earphone plug. Here, the method of adjusting the microphone volume may be the same as adjusting the audio volume, but upon adjustment of the microphone volume, such an implementation may adjust the microphone volume when the earphone plug is rotated while the control key on the earphone remains pressed. Subsequently, as long as the connection of the earphone is not released in step 1120, the electronic device 101 returns to step 1100 to repeat the above-described operations.

Figure 12:
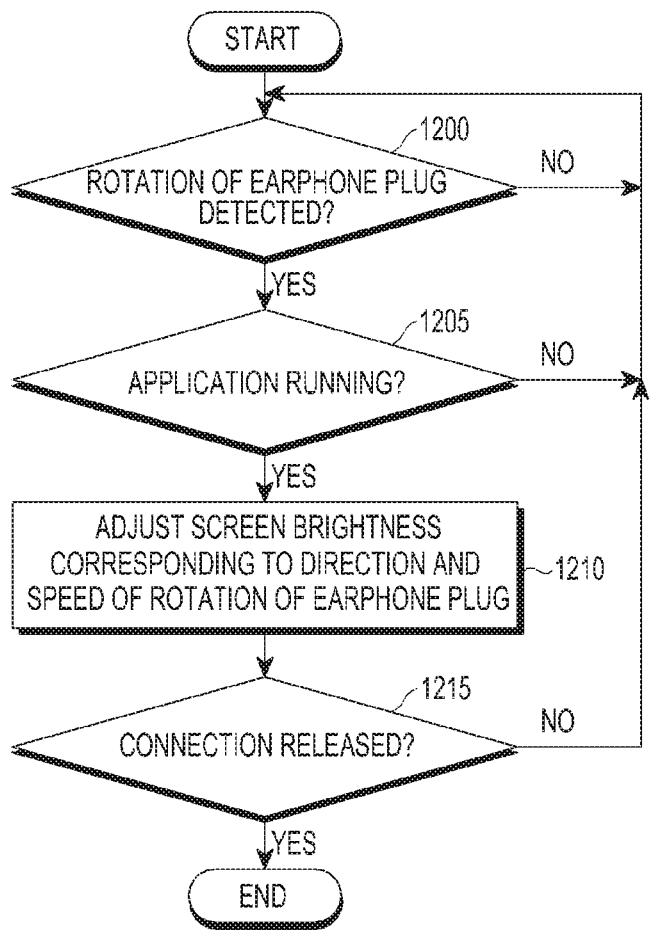
FIG. 12 is a flowchart illustrating operations of an electronic device for adjusting the screen brightness of the electronic device as an earphone plug rotates according to an embodiment of the present disclosure.

FIG. 12 is a flowchart illustrating operations of an electronic device for adjusting the screen brightness of the electronic device as an earphone plug rotates according to an embodiment of the present disclosure.

Referring to FIG. 12, upon detecting the rotation of the earphone plug in step 1200, it is determined in step 1205 whether an application is running. When the application is running, the electronic device 101, in step 1210, adjusts the screen brightness corresponding to the direction and speed of rotation of the earphone plug. Subsequently, as long as the connection of the earphone is not released in step 1215, the electronic device 101 returns to step 1100 to repeat the above-described operations. For example, when the user is using an application that does not require audio output, such as Internet surfing or social network service (SNS) while an earphone 200 is plugged in the electronic device 101, the screen brightness may be adjusted by rotating the earphone plug. Further, other various functions, such as magnifying or shrinking a display screen, may be controlled as well.

FIG. 13A illustrates an example navigation screen of a play-related object of an electronic device as an earphone plug rotates according to an embodiment of the present disclosure.

FIG. 13B illustrates an example navigation screen of a play-related object of an electronic device as an earphone plug rotates according to an embodiment of the present disclosure.

FIG. 13C illustrates an example navigation screen of a play-related object of an electronic device as an earphone plug rotates according to an embodiment of the present disclosure.

FIGS. 13A, 13B and 13C illustrate examples in which navigation or playback of a play-related object, such as a music file, is controlled by the rotation of the earphone plug. For example, when the user rotates the earphone plug while a first screen 1300 is displayed, a switch to a screen 1310 for a next song may show up with a playback screen 1320 displayed. As such, the user may perform control of navigation to a desired music file or playback of the previous or subsequent song by rotating the earphone plug.

As used herein, the term "module" includes a unit configured in hardware, software, or firmware and may be interchangeably used with other terms, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or is to be developed in the future as performing some operations.

According to an embodiment of the present disclosure, at least a part of the device (e.g., modules or their functions) or method (e.g., operations or steps) may be implemented as instructions stored in a non-transitory computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter.

Modules or programming modules in accordance with various embodiments of the present disclosure may include at least one or more of the aforementioned components, omit some of them, or further include other components. Operations performed by modules, programming modules or other components in accordance with various embodiments of the present disclosure may be carried out sequentially, in parallel, repeatedly or heuristically, or at least some operations may be executed in a different order or omitted, or other operations may be added.

According to an embodiment of the present disclosure, a storage medium may store instructions configured to, when executed by at least one processor, enable the at least one processor to perform at least one operation that may include, when a plug is inserted into a hole of a connecting member, recognize connection of the plug, the connecting member exposed through a surface of a housing of the electronic device and having a first conductive pattern formed in an inner surface, wherein a second conductive pattern is formed in the plug and control the function of the electronic device according to rotation of the plug corresponding to an alignment between the first conductive pattern and the second conductive pattern.

The embodiments disclosed herein are for describing and understanding the disclosed technology and do not limit the scope of the present disclosure. Accordingly, the scope of the present disclosure should be interpreted as including all changes or various embodiments based on the technical spirit of the present disclosure as defined in the appended claims and their equivalents.

What is claimed is:

1. An electronic device, comprising:
   a housing;
   a connecting member having a first conductive pattern formed on an inner surface thereof, wherein the first conductive pattern is configured to include a plurality of contact points connectable to a second conductive pattern formed on a plug configured to be inserted into a hole of the connecting member; and
   a processor configured to:
      detect voltage corresponding to the plurality of contact points, when the at least one of the second conductive pattern contacts to at least one of the plurality of contact points,
      detect a direction of rotation of the plug based on detected voltage, and
      control a function of the electronic device according to the direction of rotation of the plug when the plug is inserted into the hole of the connecting member.

2. The electronic device of claim 1, wherein the first conductive pattern is formed on an inner surface of the connecting member formed in a cylindrical shape having a side open to a surface of the housing and includes a plurality of contact points arranged on a first circumference of the inner surface.

3. The electronic device of claim 2, wherein the plurality of contact points are arranged on a first circumference of the inner surface spaced apart from each other at predetermined distances.

4. The electronic device of claim 1, wherein the second conductive pattern is formed on at least a portion of areas surrounding an outer surface of a body of at least one of a microphone terminal, a first audio terminal, and a second audio terminal of the plug.

5. The electronic device of claim 4, wherein the second conductive pattern is formed in a lengthwise direction from an end of the plug and is formed on a second circumference of the outer surface of the body of at least one of the microphone terminal, the first audio terminal, and the second audio terminal of the plug.

6. The electronic device of claim 5, wherein other areas except for the at least one portion of the areas surrounding the outer surface of the body of at least one of the microphone terminal, the first audio terminal, and the second audio terminal of the plug are formed of a non-conductive material.

7. The electronic device of claim 2, wherein a width of the second conductive pattern is dimensioned to contact two of the plurality of contact points.

8. The electronic device of claim 2, wherein the processor is further configured to control the function of the electronic device according to a signal detected through the plurality of contact points of the connecting member as the plug which includes the second conductive pattern rotates in the hole.

9. The electronic device of claim 2, wherein the alignment between the first conductive pattern and the second conductive pattern includes a state in which the second conductive pattern is connected with any one of the plurality of contact points of the first conductive pattern.

10. The electronic device of claim 2, wherein the plurality of contact points include four contact points when the plug is a four-pole earphone plug.

11. The electronic device of claim 1, wherein the processor is further configured to control a volume of the electronic device and a speed of adjustment of the volume according to a direction and a degree of rotation of the plug.

12. The electronic device of claim 1, wherein the processor is further configured to adjust at least one of a screen brightness and a screen size of the electronic device according to a direction of rotation of the plug.

13. A method for controlling a function of an electronic device, the method comprising:
when a plug is inserted into a hole of a connecting member, recognizing connection of the plug, wherein the connecting member is exposed through a surface of a housing of the electronic device and has a first conductive pattern formed on an inner surface, and wherein a second conductive pattern is formed on the plug, wherein the first conductive pattern is configured to include a plurality of contact points connectable to a second conductive pattern formed on a plug configured to be inserted into a hole of the connecting member; and
detecting voltage corresponding to the plurality of contact points, when the at least one of the second conductive pattern contacts to at least one of the plurality of contact points;
detecting a direction of rotation of the plug based on detected voltage; and
controlling a function of the electronic device according to the direction of rotation of the plug when the plug is inserted into the hole of the connecting member.

14. The method of claim 13, wherein the plurality of contact points are further configured to include four contact points spaced apart from each other when the plug is a four-pole earphone plug.

15. The method of claim 13, wherein controlling the function of the electronic device includes controlling a volume of the electronic device and a speed of adjustment of the volume according to a direction and a degree of the rotation of the plug.

* * * * *